US012724842B2

(12) United States Patent
Niu et al.

(10) Patent No.: US 12,724,842 B2
(45) Date of Patent: Sep. 1, 2026

(54) METHOD AND APPARATUS, ELECTRONIC DEVICE, AND COMPUTER READABLE STORAGE MEDIUM FOR DISPLAYING COMMENT INFORMATION RELATED TO A FIRST CONTENT AND REVIEW INFORMATION RELATED TO A FIRST OBJECT

(71) Applicant: Douyin Vision Co., Ltd., Beijing (CN)

(72) Inventors: Huizhen Niu, Beijing (CN); Xuan Wang, Beijing (CN)

(73) Assignee: DOUYIN VISION CO., LTD., Beijing (CN)

( * ) Notice: Subject to any disclaimer, the term of this patent is extended or adjusted under 35 U.S.C. 154(b) by 0 days.

(21) Appl. No.: 18/310,924

(22) Filed: May 2, 2023

(65) Prior Publication Data

US 2023/0273709 A1 Aug. 31, 2023

Related U.S. Application Data

(63) Continuation of application No. PCT/CN2021/128804, filed on Nov. 4, 2021.

(30) Foreign Application Priority Data

Nov. 4, 2020 (CN) ........................ 202011215160.X

(51) Int. Cl.
*G06F 3/0484* (2022.01)
*G06F 3/0483* (2013.01)

(52) U.S. Cl.
CPC .......... *G06F 3/0483* (2013.01); *G06F 3/0484* (2013.01)

(58) Field of Classification Search
CPC ............................ G06F 3/0483; G06F 3/0484
See application file for complete search history.

(56) References Cited

U.S. PATENT DOCUMENTS

| | | | |
|---|---|---|---|
| 9,129,008 | B1 | 9/2015 | Kuznetsov |
| 2008/0018670 | A1 | 1/2008 | Araki |

(Continued)

FOREIGN PATENT DOCUMENTS

| | | | |
|---|---|---|---|
| CN | 104239356 | A | 12/2014 |
| CN | 104618806 | A | 5/2015 |

(Continued)

OTHER PUBLICATIONS

International Search Report and Written Opinion issued in PCT/CN2021/128804, dated Jan. 19, 2022, 12 pages provided, with English translation.

(Continued)

*Primary Examiner* — Rinna Yi
(74) *Attorney, Agent, or Firm* — Astute IP Law Group

(57) ABSTRACT

Disclosed in embodiments of the present disclosure are an information display method and apparatus, an electronic device, and a computer readable storage medium. The information display method comprises: displaying a first page, the first page comprising first content and a first component; and in response to reception of a trigger signal of the first component, displaying a second page, the second page comprising first information related to the first content and second information related to a first object, and the first object being related to the first content. According to the method, multiple types of information are displayed on the same page, so that the problem of resource consumption caused by access to long-path information is solved.

14 Claims, 4 Drawing Sheets

(56) References Cited

U.S. PATENT DOCUMENTS

2009/0030794 A1 1/2009 Scheflan et al.
2012/0167145 A1* 6/2012 Incorvia ........... H04N 21/47815 725/60
2012/0308202 A1* 12/2012 Murata .................. G11B 27/34 386/241
2014/0089800 A1 3/2014 Kao et al.
2015/0245103 A1* 8/2015 Conte ................ G06Q 30/0643 725/60
2015/0278235 A1 10/2015 Norwood et al.
2017/0164057 A1* 6/2017 Lenahan ............ H04N 21/4312
2020/0175087 A1 6/2020 Sun
2021/0352348 A1* 11/2021 Reid ...................... G11B 27/34

FOREIGN PATENT DOCUMENTS

CN 105117934 A 12/2015
CN 105528135 A 4/2016
CN 106791970 A 5/2017
CN 108712683 A 10/2018
CN 109618212 A 4/2019
CN 109710871 A 5/2019
CN 110337023 A 10/2019
CN 110784754 A 2/2020
CN 110858378 A 3/2020
CN 111259271 A 6/2020
CN 111738801 A 10/2020
CN 112395022 A 2/2021
JP 2005141583 A 6/2005
JP 2014-519277 A 8/2014
JP 2018180928 A 11/2018
JP 6463826 B1 1/2019
JP 6472505 B1 2/2019
JP 7586589 B2 11/2024
KR 20190060359 A 6/2019

OTHER PUBLICATIONS

Office Action issued in corresponding Chinese Application No. 202011215160.X, dated Feb. 25, 2022, with English translation, 19 pages provided.
Notice on Grant; Chinese Patent Application No. 202011215160.X, Jun. 29, 2023 (5 pages).
Decision to Grant a Patent for Japanese Patent Application No. 2023-526508, mailed on Oct. 8, 2024, 5 pages.
Extended European Search Report, European Patent Application No. 21888634.9, Feb. 9, 2024 (7 pages).
Notice of Reasons for Refusal, Japanese Patent Application No. 2023-526508, May 21, 2024, with machine translation (8 pages).

* cited by examiner

METHOD AND APPARATUS, ELECTRONIC DEVICE, AND COMPUTER READABLE STORAGE MEDIUM FOR DISPLAYING COMMENT INFORMATION RELATED TO A FIRST CONTENT AND REVIEW INFORMATION RELATED TO A FIRST OBJECT

CROSS REFERENCE OF RELATED APPLICATION

The present application is a continuation application of International Patent Application No. PCT/CN2021/128804, titled "INFORMATION DISPLAY METHOD AND APPARATUS, ELECTRONIC DEVICE, AND COMPUTER READABLE STORAGE MEDIUM", filed on Nov. 4, 2021, which claims priority to Chinese Patent Application No. 202011215160.X, titled "INFORMATION DISPLAY METHOD AND APPARATUS, ELECTRONIC DEVICE, AND COMPUTER READABLE STORAGE MEDIUM", filed on Nov. 4, 2020 with the China National Intellectual Property Administration, both of which are incorporated herein by reference in their entireties.

FIELD

The present disclosure relates to the field of information display, and in particular to a method and a device for displaying information, an electronic device, and a computer-readable storage medium.

BACKGROUND

Many platforms currently support content review. For example, the user may evaluate a product after purchasing the product, and comment on a video after watching the video or an article after reading the article. Some platforms display products through videos or articles, and users only see reviews on the videos or articles from other users. In order to see product reviews and the like, the user has to search for a product display page and search for product review information on the product display page. In this way, the information search path is long, resulting in a waste of resources.

SUMMARY

This summary is provided to introduce concepts in a simplified form. These concepts will be described in detail in the following detailed description. This summary is neither intended to identify key features or essential features of the claimed technical solution, nor intended to limit the scope of the claimed technical solution.

In order to solve the above technical problems, the following technical solutions are proposed in embodiments of the present disclosure.

In a first aspect, a method for displaying information is provided according to an embodiment of the present disclosure. The method includes: displaying a first page, where the first page includes first content and a first component; and displaying a second page in response to receiving a trigger signal of the first component, where the second page includes first information related to the first content and second information related to a first object, and the first object is related to the first content.

In a second aspect, a device for displaying information is provided according to an embodiment of the present disclosure. The device includes: a first display module and a second display module. The first display module is configured to display a first page. The first page includes first content and a first component. The second display module is configured to: display a second page in response to receiving a trigger signal of the first component. The second page includes first information related to the first content and second information related to a first object, and the first object is related to the first content.

In a third aspect, an electronic device is provided according to an embodiment of the present disclosure. The electronic device includes at least one processor, and a memory communicatively connected to the at least one processor. The memory stores instructions executable by the at least one processor. The at least one processor is configured to execute the instructions, so as to perform the method in the first aspect.

In a fourth aspect, a non-transitory computer-readable storage medium is provided according to an embodiment of the present disclosure. The non-transitory computer-readable storage medium stores computer instructions that cause a computer to perform the method in the first aspect.

The method and the device for displaying information, the electronic device, and the computer-readable storage medium are provided according to the embodiments of the present disclosure. The method includes: displaying a first page, where the first page includes first content and a first component; and displaying a second page in response to receiving a trigger signal of the first component, where the second page includes first information related to the first content and second information related to a first object, and the first object is related to the first content. The above method solves the problem of resource waste caused by accessing information with a long access path by displaying multiple information on the same page.

The above summary is only an overview of the technical solution of the present disclosure. In order to better understand the technical means of the present disclosure so that the present disclosure can be implemented according to the contents of the description, and in order to make the above and other objects, features and advantages of the present disclosure more comprehensible, preferred embodiments will be described in detail below together with the drawings.

BRIEF DESCRIPTION OF THE DRAWINGS

The above and other features, advantages and aspects of the various embodiments of the present disclosure will become more apparent with reference to the following detailed description in conjunction with the drawings. Throughout the drawings, the same or similar reference numerals denote the same or similar elements. It should be understood that the drawings are schematic and that components and elements are not necessarily drawn to scale.

DETAILED DESCRIPTION

Figure 1:
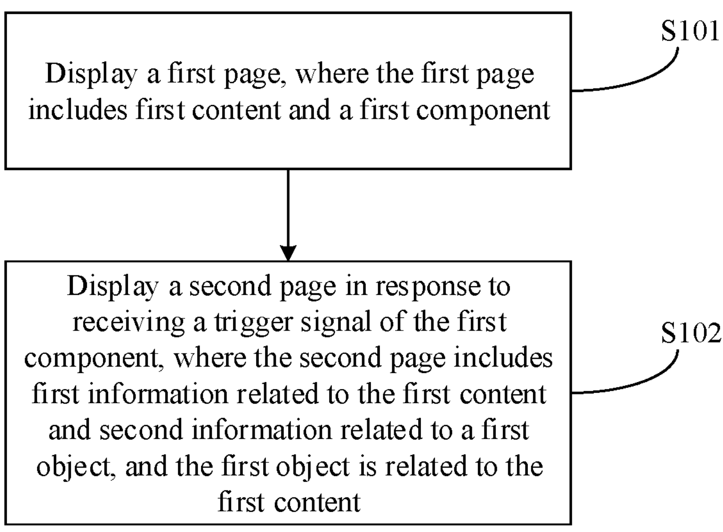
FIG. 1 is a schematic flowchart illustrating a method for displaying information according to an embodiment of the present disclosure.

Embodiments of the present disclosure will be described in more detail below with reference to the drawings. Although some embodiments of the present disclosure are shown in the drawings, it should be understood that the present disclosure may be embodied in various forms and should not be construed as limited to the embodiments set forth herein. Instead, these examples are provided so that the understanding of the present disclosure can be thorough and complete. It should be understood that the drawings and embodiments of the present disclosure are for illustrative purposes only, and are not intended to limit the protection scope of the present disclosure.

It should be understood that the various steps described in the method embodiments of the present disclosure may be performed in different orders, and/or performed in parallel. Additionally, method embodiments may include additional steps and/or illustrated steps may be not performed. The scope of the present disclosure is not limited in this regard.

The term "comprising" and its variations herein are non-exclusive, i.e., "including but not limited to". The term "based on" means "based at least in part on". The term "one embodiment" means "at least one embodiment." The term "another embodiment" means "at least one further embodiment". The term "some embodiments" means "at least some embodiments." Relevant definitions of other terms will be given in the description below.

It should be noted that concepts such as "first" and "second" mentioned herein are only for distinguishing different devices, modules or units, rather than limiting the sequence or interdependence of functions performed by these devices, modules or units.

It should be noted that the determiners of "a" and "a plurality" mentioned in the present disclosure are illustrative rather than restrictive. Those skilled in the art should understand that, unless the context clearly indicates otherwise, such determiners should be understood as "one or more".

The names of messages or information exchanged between multiple devices in the embodiments of the present disclosure are used for illustrative purposes only, and are not used to limit the scope of these messages or information.

FIG. 1 is a flowchart of a method for displaying information according to an embodiment of the present disclosure. The method for displaying information provided in this embodiment may be performed by an information display device. The information display device may be implemented as software, or as a combination of software and hardware. The information display device may be integrated in an apparatus, e.g., an information display server or an information display terminal device, in an information display system. As shown in FIG. 1, the method includes the following steps S101 to S102.

In step S101, a first page is displayed. The first page includes first content and a first component.

Optionally, the first page is a content display page in an application on a smart phone and includes the content to be displayed to a user and some functional options or components related to the content. Optionally, the first component is configured to display information related to the first content when being triggered.

Optionally, the first content is a video, and the first component is a review button. Exemplarily, a first video starts being played when the user opens the first page. The first video is for displaying a product. Alternatively, content of the first video is associated with a product.

Optionally, the first page further includes an access component of the first object. The access component of the first object provides access to the first object. When the access component of the first object is triggered, a display page of the first object is displayed. The display page of the first object includes information about the first object. Exemplarily, the first object is a produce related to the first content. The access component of the first object provides access to a product detail page. When the access component of the first object is triggered, e.g., being clicked by the user, the product detail page is displayed, so that the user can browse the detailed information of the product to decide whether to purchase the product. The access component of the first object may be displayed in a fixed area of the first page, and other information may be displayed in a sliding area of the first page, which may be comment information. Exemplarily, the first object is a person related to the first content. If the first content is a video, the first object is a person appearing in the video or an author of the video. The access component of the first object is a page access entry of the person or author. The user can access an introduction page or work display page of the person or author through the page access entry.

In step S102, a second page is displayed in response to receiving a trigger signal of the first component. The second page includes first information related to the first content and second information related to a first object. The first object is related to the first content.

Optionally, the first information is review information about the first content. The second information is review information about the first object. Exemplarily, the first content is a video, and the first information is review information from viewers of the video. The first object is a product, and the second information is review information from users who have purchased the product.

Optionally, the trigger signal of the first component is generated through a human-computer interaction interface. For example, a touch signal is received at a display area of the first component on the first page through a touch screen to generate the trigger signal of the first component. Optionally, the first component is a review button. When the display area of the review button receives a touch signal, a trigger signal of the review button is generated so as to display the information related to the first content. When the trigger signal of the first component is received, the second page is displayed. The second page includes the first information and the second information. The second information is related to the first object. The first object is related to the first content. In this way, the information related to the first object and the information related to the first content can be displayed on the same page. It is unnecessary to visit the display page of the first object to display the information related to the first object. Therefore, the access path of the relevant information of the first object is shortened, and thus resources are saved.

Optionally, the step S102 includes the following steps S201 to S203.

In step S201, the first information related to the first content is acquired in response to receiving a trigger signal of the first component, and second information related to the first object in the first content is acquired.

In step S202, a display position of the second information is determined according to an information display mode.

In step S203, the second page is generated according to the display position, the first information and the second information, and is displayed.

In step S201, the first information related to the first content is acquired from the first page, and the second information related to the first object is acquired from the display page of the first object. Optionally, the first page includes an aggregation module of the first information, which is configured to aggregate display the first information related to the first content. Exemplarily, the first content is a video, and the first information is a review on the video. The reviews on the video are all stored in the aggregation module of the first information. When the trigger signal of the first component is received, the first information is acquired from the aggregation module of the first information. Optionally, the display page of the first object includes an aggregation module of the second information, which is configured to aggregate display second information related to the first object. Exemplarily, the first object is a product, and the second information is review information about the product. When the trigger signal of the first component is received, the second information is acquired from the aggregation module of the second information.

In step S202, the display position of the second information is determined according to the information display mode. The display mode is preset. Each display mode corresponds to a display position. That is, the position on the second page where the second information is to be displayed is determined based on the display mode.

In step S203, the second information is displayed at the display position, and the first information is displayed at a default display position, so as to generate the second page. Exemplarily, the first information is displayed on top of the second page, and the second information is displayed in middle of the second page, so as to generate the second page.

In the above embodiment, the second information related to the first object is acquired when the trigger signal of the first component is received, and is displayed on the second page together with the first information. Since there is unnecessary to search for the display page of the first object and search the display page of the first object for the second information, thereby resolving the problem of resource waste caused by accessing the display page of the first object and searching for the second information.

Optionally, the second page also includes an access component of the first object, so that the user can access the display page of the first object without returning to the first page after viewing the information on the second page. Exemplarily, the first object is a product, and the display page of the first object is a detailed and purchase page of the product. In this alternative embodiment, the second information is displayed in a first display area where the access component of the first object is displayed. In this alternative embodiment, the second page includes two display areas. The first display area is for displaying the access component of the first object, and may also display information related to the first object. If the first object is a product, a name, a selling price and sales volume of the product then are displayed in the first display area. In an embodiment of the present disclosure, the second information, e.g., review information of the product, is also displayed in the first display area. Optionally, the review information includes one or more reviews with the largest number. In this way, the user can view the review information of the product without accessing the detail page of the product.

Optionally, the second information is displayed in the second display area where the first information is displayed. The first information and the second information are displayed separately in the second display area. Exemplarily, the second display area is a review area. The first information is review information about the first content. The second information is review information about the first object. In this alternative embodiment, the second information is set on top of all the first information, so as to highlight the second information. The first information and the second information are displayed separately in the second display area. Exemplarily, a section break is set between the first information and the second information, so as to distinguish the first information from the second information.

Optionally, the second information is displayed in the second display area where the first information is displayed. The first information and the second information combine in the second display area. Exemplarily, the second display area is a review area. The first information is review information about the first content. The second information is review information about the first object. In this alternative embodiment, the second information is displayed between multiple pieces of first information. That is, the second information is displayed in the second display area like the first information. Optionally, in this display mode, a mark is added to the second information to highlight the second information, e.g., changing the color of the second information, or adding a sign to the second information.

In an alternative embodiment, at least two of the above display modes may be adopted to display the second information at the same time, which is not described in detail herein.

It should be understood that the above three display modes are only examples and do not constitute limitations to the present disclosure. In fact, any mode of displaying the second information on the second page is appliable to the embodiments of the present disclosure, which is not described in detail herein.

Figure 3:
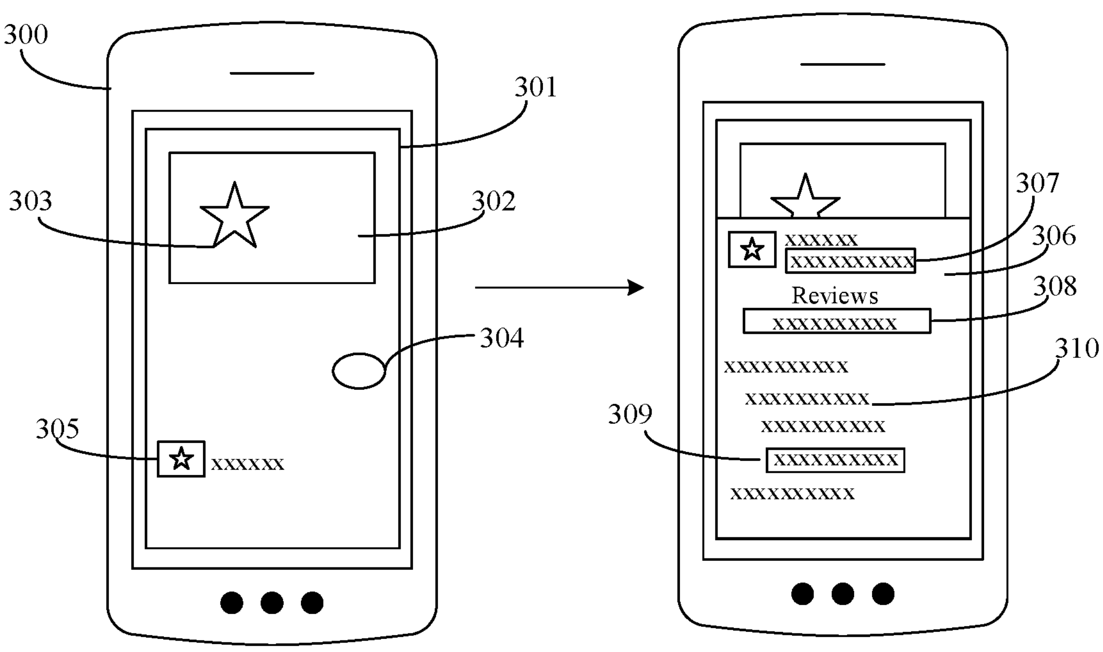
FIG. 3 is a schematic diagram of an application scenario of the method for displaying information according to an embodiment of the present disclosure.

FIG. 3 is a schematic diagram of an application scenario of an embodiment of the present disclosure. In the application scenario shown in FIG. 3, an application supporting video playing and e-commerce runs on a terminal device 300. After the user opens the application, a first page 301 is displayed. The first page includes first content, i.e., a video 302. The first content includes the first object, i.e., a product 303. The first page also includes a first component 304. The first component 304 is configured to receive a trigger signal and display review information about the video. The first page also includes a product access component 305. In the display area of the product access component 305, information about the product, such as a name and a selling price, is displayed. When a trigger signal of the first component 304 is received, the second page 306 is displayed. The second page includes review information 310 of the video 302 and review information 307 and/or 308 and/or 309 of the product 303. The review information 307 is displayed in the display area of the first component on the second page, that is, in the first display area. The review information 308 is displayed in the display area of the second information, that is, in the second display area. The review information 308 is displayed on top of all review information 310, so as to highlight the review information 308. The review information 309 is displayed in the display area of the second information, that is, in the second display area. The review information 309 is further displayed among multiple review information 310. In this way, the information with a long access path is displayed on the same page with other information, and more information is displayed on the same page, so as to reduce resource waste caused by accessing information with the long access path.

The method for displaying information is disclosed according to embodiments of the present disclosure. The method includes: displaying a first page, where the first page includes first content and a first component; and displaying a second page in response to receiving a trigger signal of the first component. The second page includes first information related to the first content and second information related to a first object. The first object is related to the first content. The above method solves the problem of resource waste caused by accessing information with a long access path by displaying multiple information on the same page.

Although the steps in the above method embodiments are described in the above order, it should be clear to those skilled in the art that the steps in the embodiments of the present disclosure are not necessarily performed in the above order. Alternatively, the steps may be performed in reverse, parallel, interleaved, or other sequences. Moreover, on the basis of the above steps, those skilled in the art may also add other steps. These obvious modifications or equivalent replacements should also be included in the protection scope of the present disclosure, and are not described in detail herein.

Figure 4:
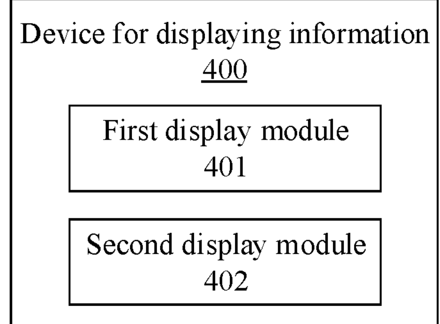
FIG. 4 is a schematic structural diagram of a device for displaying information according to an embodiment of the present disclosure.

FIG. 4 is a schematic structural diagram of a device for displaying information according to an embodiment of the present disclosure. As shown in FIG. 4, the device 400 includes: a first display module 401 and a second display module 402.

The first display module 401 is configured to display a first page. The first page includes first content and a first component.

The second display module 402 is configured to display a second page in response to receiving a trigger signal of the first component. The second page includes first information related to the first content and second information related to a first object. The first object is related to the first content.

Further, the first content is video content, and the first component is a review button.

Further, the first page also includes an access component of the first object.

Further, the second page includes an access component of the first object, and the first information is displayed in a first display area where the access component of the first object is displayed.

Further, the second information is displayed in a second display area where the first information is displayed. The first information and the second information are displayed separately in the second display area.

Further, the second information is displayed in a second display area where the first information is displayed. The first information and the second information combine in the second display area.

Further, the second display module 402 is further configured to: acquire the first information related to the first content in response to receiving a trigger signal of the first component, and acquire the second information related to the first object in the first content; determine a display position of the second information according to an information display mode; and generate the second page according to the display position, the first information and the second information, and display the second page.

Further, acquisition of the second information related to the first object in the first content includes: acquiring the second information from a display page of the first object.

Further, the first information is review information about the first content, and the second information is review information about the first object.

Figure 2:
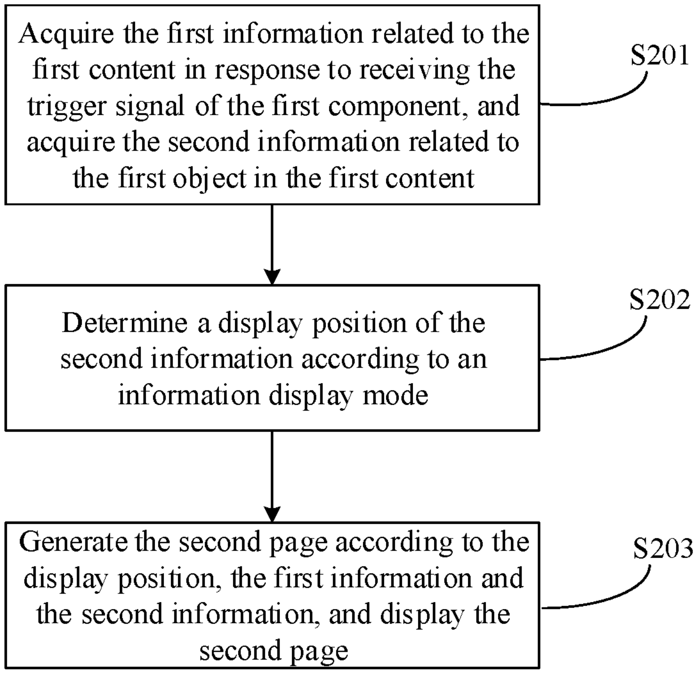
FIG. 2 is a schematic flowchart illustrating the method for displaying information in detail according to an embodiment of the present disclosure.

The device shown in FIG. 4 may perform the method in the embodiments shown in FIG. 1 and FIG. 2. For the parts not described in detail in this embodiment, reference may be made to the relevant description of the embodiments shown in FIG. 1 and FIG. 2. Details about the process and technical effects of this technical solution may refer to the description in the embodiments shown in FIG. 1 and FIG. 2, and thus are not repeated here.

Figure 5:
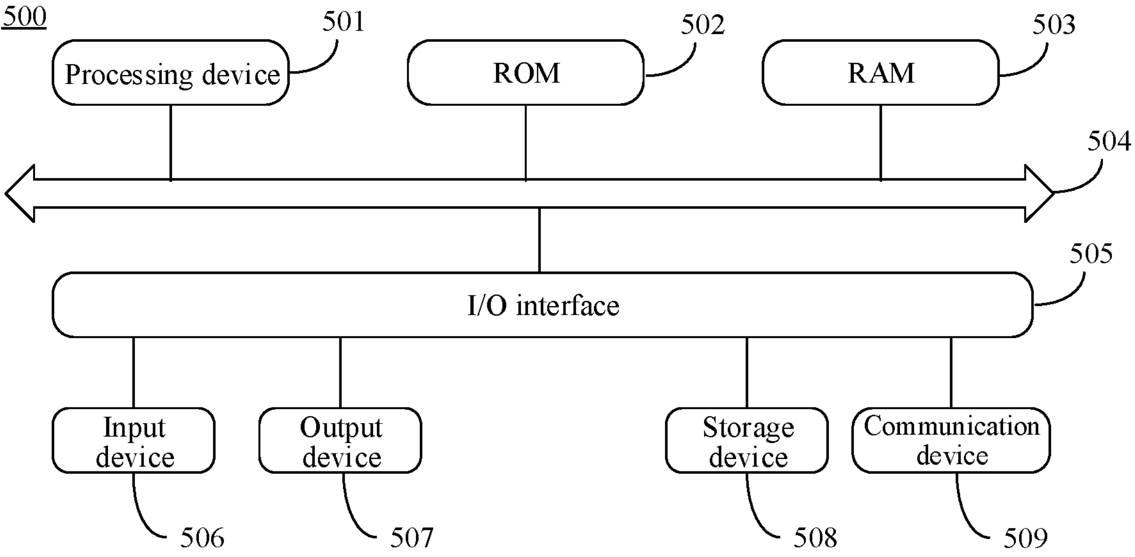
FIG. 5 is a schematic structural diagram of an electronic device according to an embodiment of the present disclosure.

Reference is made to FIG. 5, which is a schematic structural diagram of an electronic device 500 suitable for implementing the embodiments of the present disclosure. The terminal device in the embodiments of the present disclosure may include but not limited to mobile terminals such as mobile phones, notebook computers, digital broadcast receivers, PDAs (personal digital assistants), PADs (tablet computers), PMPs (portable multimedia players) and vehicle terminals (such as car navigation terminals); and fixed terminals such as digital TVs and desktop computers. The electronic device shown in FIG. 5 is only an example, and should not limit the functions and application scope of the embodiments of the present disclosure.

As shown in FIG. 5, the electronic device 500 may include a processing device (such as a central processing unit and a graphics processing unit) 501. The processing device 501 can execute various appropriate actions and processes according to programs stored in a read only memory (ROM) 502 or loaded from a storage device 508 into a random-access memory (RAM) 503. In the RAM 503, various programs and data necessary for the operation of the electronic device 500 are also stored. The processing device 501, the ROM 502 and the RAM 503 are connected to each other through a bus 504. An input/output (I/O) interface 505 is also connected to the bus 504.

Generally, the following devices may be connected to the I/O interface 505: input devices 506 including, for example, a touch screen, a touch pad, a keyboard, a mouse, a camera, a microphone, an accelerometer, a gyroscope, etc.; output devices 507 including, for example, a liquid crystal display (LCD), a speaker, a vibrator, etc.; a storage device 508 including, for example, a magnetic tape, a hard disk, etc.; and a communication device 509. The communication device 509 may allow the electronic device 500 to perform wireless or wired communication with other devices to exchange data. Although FIG. 5 shows the electronic device 500 having various devices, it should be understood that implementing or having all of the devices shown is not a requirement. More or fewer devices may alternatively be implemented or provided.

In particular, according to an embodiment of the present disclosure, the processes described above with reference to the flowcharts may be implemented as computer software programs. For example, embodiments of the present disclosure include a computer program product. The computer program product includes a computer program carried on a non-transitory computer-readable medium. The computer program contains program code for carrying out the methods shown in the flowcharts. In such an embodiment, the computer program may be downloaded and installed from a network via the communication device 509, or from the storage device 508, or from the ROM 502. When the computer program is executed by the processing device 501, the functions defined in the methods of the embodiments of the present disclosure are performed.

It should be noted that the above computer-readable medium in the present disclosure may be a computer-readable signal medium or a computer-readable storage medium or any combination of the above two. The computer readable storage medium may be, for example, but not limited to, an electrical, magnetic, optical, electromagnetic, infrared, or semiconductor system, apparatus, or device, or any combination thereof. More specific examples of the computer-readable storage medium may include, but are not limited to: electrical connections with one or more wires, portable computer disks, hard disks, a random-access memory (RAM), a read only memory (ROM), an erasable programmable read-only memory (EPROM or Flash), optical fibers, a compact disk read-only memory (CD-ROM), optical storage devices, magnetic memory components, or any suitable combination of the above. In the present disclosure, the computer-readable storage medium may be any tangible medium that contains or stores a program. The program may be used by or in conjunction with the instruction execution system, apparatus or device. In the present disclosure, however, the computer-readable signal medium may include a data signal propagated in baseband or as part of a carrier wave, and the data signal carries computer-readable program code. Such propagated data signals may be in various forms, including but not limited to electromagnetic signals, optical signals, or any suitable combination of the foregoing. The computer-readable signal medium can also be any computer-readable medium other than the computer-readable storage medium. The computer-readable signal medium may transmit, propagate, or transport a program for use by or in connection with an instruction execution system, apparatus, or device. Program code embodied on the computer-readable medium may be transmitted by any appropriate medium, including but not limited to: wires, optical cables, RF (radio frequency), etc., or any suitable combination of the above.

In some embodiments, a client may communicate with a server using any currently known or future-developed network protocols such as HTTP (Hypertext Transfer Protocol), and the client and the server may be interconnected with digital data communication (e.g., a communication network) of any form or medium. Examples of the communication network include local area networks ("LANs"), wide area networks ("WANs"), internetworks (e.g., the Internet), and peer-to-peer networks (e.g., ad hoc peer-to-peer networks), as well as any currently known or future developed network.

The computer-readable medium may be included in the electronic device, or may exist independently without being incorporated into the electronic device.

The computer-readable medium carries one or more programs, when being executed by the electronic device, causes the electronic device to perform the method for displaying information in the above embodiments.

The computer program code for carrying out operations of the present disclosure may be written in one or more programming languages, or a combination thereof. Such programming languages include, but are not limited to, object-oriented programming languages such as Java, Smalltalk, C++, and conventional procedural programming languages such as the "C" language or similar programming languages. The program code may be executed entirely on the user computer, partly on the user computer, as a stand-alone software package, partly on the user computer and partly on a remote computer, or entirely on a remote computer or server. Where a remote computer is involved, the remote computer may be connected to the user computer through any kind of network including a local area network (LAN) or a wide area network (WAN), or may be connected to an external computer (e.g., via the Internet by an Internet service provider).

The flowcharts and block diagrams in the drawings illustrate the architecture, functionality, and operation of possible implementations of systems, methods and computer program products according to various embodiments of the present disclosure. In this regard, each block in the flowchart or block diagram may represent a module, program segment, or portion of code. The module, program segment, or portion of code contains one or more executable instructions for implementing specified logical functions. It should also be noted that, in some alternative implementations, the functions noted in the blocks may occur in an order different form the order noted in the drawings. For example, two blocks shown in succession could, in fact, be executed substantially concurrently or in a reverse order, depending upon the functionality involved. Further, each block in the block diagrams and/or flow charts, and a combination of blocks in the block diagrams and/or flow diagrams may be performed by a dedicated hardware-based system that performs the specified functions or operations or by a combination of dedicated hardware and computer instructions.

The units involved in the embodiments described in the present disclosure may be implemented by software or by hardware. The name of a unit does not in any way constitute a qualification of the unit itself.

The functions described herein above may be performed at least in part by one or more hardware logic components. For example, without limitation, exemplary hardware logic components that may be used include: field programmable gate arrays (FPGAs), application specific integrated circuits (ASICs), application specific standard products (ASSPs), system on chips (SOCs), complex programmable logical devices (CPLDs), etc.

In the context of the present disclosure, the machine-readable medium may be a tangible medium that may contain or store a program for use by or in conjunction with an instruction execution system, apparatus, or device. The machine-readable medium may be a machine-readable signal medium or a machine-readable storage medium. The machine-readable medium may include, but is not limited to, electronic, magnetic, optical, electromagnetic, infrared, or semiconductor systems, apparatus, or devices, or any suitable combination of the foregoing. More specific examples of the machine-readable storage medium may include one or more wire-based electrical connections, portable computer disks, hard disks, a random-access memory (RAM), a read only memory (ROM), an erasable programmable read only memory (EPROM or flash memory), fiber optics, a compact disk read-only memory (CD-ROM), optical storage devices, magnetic storage devices, or any suitable combination of the foregoing.

According to one or more embodiments of the present disclosure, there is provided a method of displaying information. The method includes:

displaying a first page, where the first page includes first content and a first component; and displaying a second page in response to receiving a trigger signal of the first component, where the second page includes first information related to the first content and second information related to a first object, and the first object is related to the first content.

Further, the first content is video content, and the first component is a review button.

Further, the first page further comprises an access component of the first object.

Further, the second page includes an access component of the first object, and the first information is displayed in a first display area where the access component of the first object is displayed.

Further, the second information is displayed in a second display area where the first information is displayed, and the first information and the second information are displayed separately in the second display area.

Further, the second information is displayed in a second display area where the first information is displayed, and the first information and the second information combine in the second display area.

Further, the displaying a second page in response to receiving a trigger signal of the first component includes:

acquiring the first information related to the first content in response to receiving the trigger signal of the first component, and acquiring the second information related to the first object in the first content;

determining a display position of the second information according to an information display mode; and generating the second page according to the display position, the first information and the second information, and displaying the second page.

Further, the acquiring the second information related to the first object in the first content includes:

acquiring the second information from a display page of the first object.

Further, the first information is review information about the first content, and the second information is review information about the first object.

According to one or more embodiments of the present disclosure, there is provided a device for displaying information. The device includes:

a first display module configured to display a first page, where the first page includes first content and a first component; and a second display module configured to: display a second page in response to receiving a trigger signal of the first component, where the second page includes first information related to the first content and second information related to a first object, and the first object is related to the first content.

Further, the first content is video content, and the first component is a review button.

Further, the first page also includes an access component of the first object.

Further, the second page includes an access component of the first object, and the first information is displayed in a first display area where the access component of the first object is displayed.

Further, the second information is displayed in a second display area where the first information is displayed, and first information and the second information are displayed separately in the second display area.

Further, the second information is displayed in a second display area where the first information is displayed, and the first information and the second information combine in the second display area.

Further, the second display module is further configured to:

acquire the first information related to the first content in response to receiving a trigger signal of the first component, and acquire the second information related to the first object in the first content;

determine a display position of the second information according to an information display mode; and generate a second page according to the display position, the first information and the second information, and display the second page.

Further, acquisition of the second information related to the first object in the first content includes: acquiring the second information from a display page of the first object.

Further, the first information is review information about the first content, and the second information is review information about the first object.

According to one or more embodiments of the present disclosure, there is provided an electronic device. The electronic device includes at least one processor, and a memory communicatively connected to the at least one processor. The memory stores instructions executable by the at least one processor. The at least one processor is configured to execute the instructions, so as to perform the method in the first aspect.

According to one or more embodiments of the present disclosure, there is provided a non-transitory computer-readable storage medium. The non-transitory computer-readable storage medium stores computer instructions that cause a computer to perform the method for displaying information.

Only preferred embodiments of the present disclosure and an illustration of the applied technical principle are described above. Those skilled in the art should understand that, the scope of the present disclosure is not limited to the technical solution formed by specific combinations of the above technical features, but also covers other technical solutions formed by any combination of the above technical features or their equivalent features without departing from the above disclosed concept, for example, a technical solution formed by replacing the above features with technical features with similar functions disclosed in (but not limited to) the present disclosure.

The invention claimed is:

1. A method for displaying information, comprising:

displaying a first page on a screen of a device, wherein the first page displays first content comprising at least a first object, a first component, and a first information;

wherein the first object is a product related to the first content, and the first page displays a display page of the first object including a second information in response to receiving a trigger signal of an access component of the first object displayed in the first page; and displaying a second page separately over a portion of the first page on the screen of the device in response to receiving a trigger signal of the first component, wherein the second page displays the first information and the second information, which is a combined display of the first information acquired from the first page and the second information acquired from the display page of the first object in the first page, the first information comprises comment information received from viewers of the first content and the second information comprises review information from users who have purchased the first object acquired from a display page of the first object.

2. The method for displaying information according to claim 1, wherein the first content is video content, and the first component is a comment button.

3. The method for displaying information according to claim 1, wherein the second page comprises an access component of the first object, and the first information is displayed in a first display area where the access component of the first object is displayed.

4. The method for displaying information according to claim 1, wherein the second page comprises an access component of the first object, and the first information is displayed in a first display area where the access component of the first object is displayed.

5. The method for displaying information according to claim 1, wherein the second information is displayed in a second display area where the first information is displayed, and the first information and the second information are displayed separately in the second display area.

6. The method for displaying information according to claim 1, wherein the second information is displayed in a second display area where the first information is displayed, and the first information and the second information combine in the second display area.

7. The method for displaying information according to claim 1, wherein the displaying a second page in response to receiving a trigger signal of the first component comprises:

acquiring the first information related to the first content in response to receiving the trigger signal of the first component, and acquiring the second information related to the first object in the first content;

determining a display position of the second information according to an information display mode; and generating the second page according to the display position, the first information and the second information, and displaying the second page.

8. A device for displaying information, comprising:

at least one processor; and at least one memory communicatively coupled to the at least one processor and storing instructions that upon execution by the at least one processor cause the device to:

display a first page on a screen of the device, wherein the first page displays first content comprising at least a first object, and a first component, and a first information;

wherein the first object is a product related to the first content, and the first page displays a display page of the first object including a second information in response to receiving a trigger signal of an access component of the first object displayed in the first page; and display a second page separately over a portion of the first page on the screen of the device in response to receiving a trigger signal of the first component, wherein the second page displays the first information and the second information, which is a combined display of the first information acquired from the first page and the second information acquired from the display page of the first object in the first page, the first information comprises comment information received from viewers of the first content and the second information comprises review information from users who have purchased the first object acquired from a display page of the first object.

9. The device of claim 8, wherein the first content is video content, and the first component is a comment button.

10. The device of claim 8, wherein the second page comprises an access component of the first object, and the first information is displayed in a first display area where the access component of the first object is displayed.

11. The device of claim 8, wherein the second information is displayed in a second display area where the first information is displayed, and the first information and the second information are displayed separately in the second display area.

12. The device of claim 8, wherein the second information is displayed in a second display area where the first information is displayed, and the first information and the second information combine in the second display area.

13. The device of claim 8, the at least one memory further storing instructions that upon execution by the at least one processor cause the device to:

acquire the first information related to the first content in response to receiving the trigger signal of the first component, and acquiring the second information related to the first object in the first content;

determine a display position of the second information according to an information display mode; and generate the second page according to the display position, the first information and the second information, and displaying the second page.

14. A non-transitory computer-readable storage medium for storing computer-readable instructions, wherein the non-transitory computer readable instructions, when executed by a computer, cause the computer to display a first page on a screen of a device, wherein the first page displays first content comprising at least a first object, a first component, and a first information;

wherein the first object is a product related to the first content, and the first page displays a display page of the first object including a second information in response to receiving a trigger signal of an access component of the first object displayed in the first page; and display a second page separately over a portion of the first page on the screen of the device in response to receiving a trigger signal of the first component, wherein the second page displays the first information and the second information, which is a combined display of the first information acquired from the first page and the second information acquired from the display page of the first object in the first page, the first information comprises comment information received from viewers of the first content and the second information comprises review information from users who have purchased the first object acquired from a display page of the first object.

* * * * *